US006782984B2

(12) United States Patent
Tsunekawa et al.

(10) Patent No.: US 6,782,984 B2
(45) Date of Patent: Aug. 31, 2004

(54) CONTROL METHOD FOR LOCKUP CLUTCH

(75) Inventors: Kazutoshi Tsunekawa, Kariya (JP); Yuuki Ohta, Okazaki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/386,504

(22) Filed: Mar. 13, 2003

(65) Prior Publication Data

US 2004/0029672 A1 Feb. 12, 2004

(30) Foreign Application Priority Data

Mar. 13, 2002 (JP) ........................................ 2002-068443

(51) Int. Cl.[7] .............................................. F16H 61/14
(52) U.S. Cl. ................. 192/3.31; 192/109 F; 74/732.1; 475/65; 701/68
(58) Field of Search ............................... 192/3.29–3.31; 74/731.1, 732.1; 477/62–65, 174–176, 180; 701/59, 68; 475/65

(56) References Cited

U.S. PATENT DOCUMENTS 5,741,203 A * 4/1998 Nishio ........................ 477/154
5,800,308 A * 9/1998 Tsutsui et al. .............. 477/116
5,893,438 A * 4/1999 Hasegawa et al. ........... 192/3.3

FOREIGN PATENT DOCUMENTS

JP          5-296337 A     11/1993
JP          08080766 A  *  3/1996   ........... B60K/41/02

* cited by examiner

Primary Examiner—Richard M. Lorence
(74) Attorney, Agent, or Firm—Burns, Doane, Swecker & Mathis, L.L.P.

(57) ABSTRACT

A control method of a lockup clutch includes eliminating a loss stroke of a piston by a pre-charge of a supplied hydraulic pressure, increasing a force applied to the piston by further supply of the hydraulic pressure after the pre-charge, controlling a slip rotation speed between a pump impeller and a turbine runner in a torque converter connected to an automatic transmission, and determining a time for performing the pre-charge when a shift stage of the automatic transmission is under a neutral state and a vehicle is substantially stopped.

7 Claims, 6 Drawing Sheets

CONTROL METHOD FOR LOCKUP CLUTCH

This application is based on and claims priority under 35 U.S.C. § 119 with respect to Japanese Patent Application No. 2002-068443 filed on Mar. 13, 2002, the entire content of which is incorporated herein by reference.

FIELD OF THE INVENTION

The present invention relates to a control method for a lockup clutch for controlling a slip rotation speed of a pump impeller and a turbine runner of a hydraulic power transmission mechanism. More particularly, the present invention pertains to a control method for a lockup clutch for determining a time for performing a pre-charge.

BACKGROUND OF THE INVENTION

With a known lockup clutch provided on a torque converter, lockup control or slip control between a pump impeller and a turbine runner is performed by controlling pressure from a piston by controlling supplied hydraulic pressure. A time lag is generated from the hydraulic pressure to actually operating a friction plate of the lockup clutch to start engaging the pump impeller and the turbine runner due to a loss stroke of the piston. Provided that the time lag is increased, a response to reach the lockup control or the slip control is deteriorated. In order to restrain the influence of the loss stroke, the piston is operated swiftly by increasing the supply speed of the hydraulic pressure during pre-charging. However, because the greatness of the loss stroke of the piston is varied by abrasion of the lockup clutch or by change of properties with time, a predetermined pre-charge time becomes not applicable, which may cause a shock at the engagement of the lockup clutch.

Another known lockup clutch for obviating the foregoing drawback is disclosed in Japanese Patent Laid-Open Publication No. H5(1993)-296337. According to the known lockup clutch disclosed in Japanese Patent Laid-Open Publication No. H5(1993)-296337, a torque sensor for detecting an output shaft torque of an automatic transmission is provided in a system in which a torque converter and a lockup clutch are arranged in parallel in order to maximally shorten a loss stroke time of the piston within a range not generating the engagement shock of the lockup clutch. Waveform balance of an initial pressure waveform and of a final pressure wave balance during the pre-charge is amended so that the operation result of the piston by the pre-charge corresponding to a predetermined request using an output signal of the torque sensor.

Notwithstanding, because the waveform balance during the pre-charge is amended using the output shaft toque of the automatic transmission with the known lockup clutch disclosed in Japanese Patent Laid-Open Publication No. H5(1993)-296337, the lockup clutch is once suddenly engaged at the amendment of the waveform balance. Thus, the engagement shock of the lockup clutch may be caused during the amendment of the waveform balance.

A need thus exists for a lockup clutch and a control method of the lockup clutch which restrains the deterioration of the response performance due to the loss stroke of the lockup clutch and the engagement shock of the lockup clutch.

SUMMARY OF THE INVENTION

In light of the foregoing, the present invention provides a control method of a lockup clutch which includes eliminating a loss stroke of a piston by a pre-charge of a supplied hydraulic pressure, increasing a force applied to the piston by further supply of the hydraulic pressure after the pre-charge, controlling a slip rotation speed between a pump impeller and a turbine runner in a torque converter connected to an automatic transmission, and determining a time for performing the pre-charge when a shift stage of the automatic transmission is under a neutral state and a vehicle is substantially stopped.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
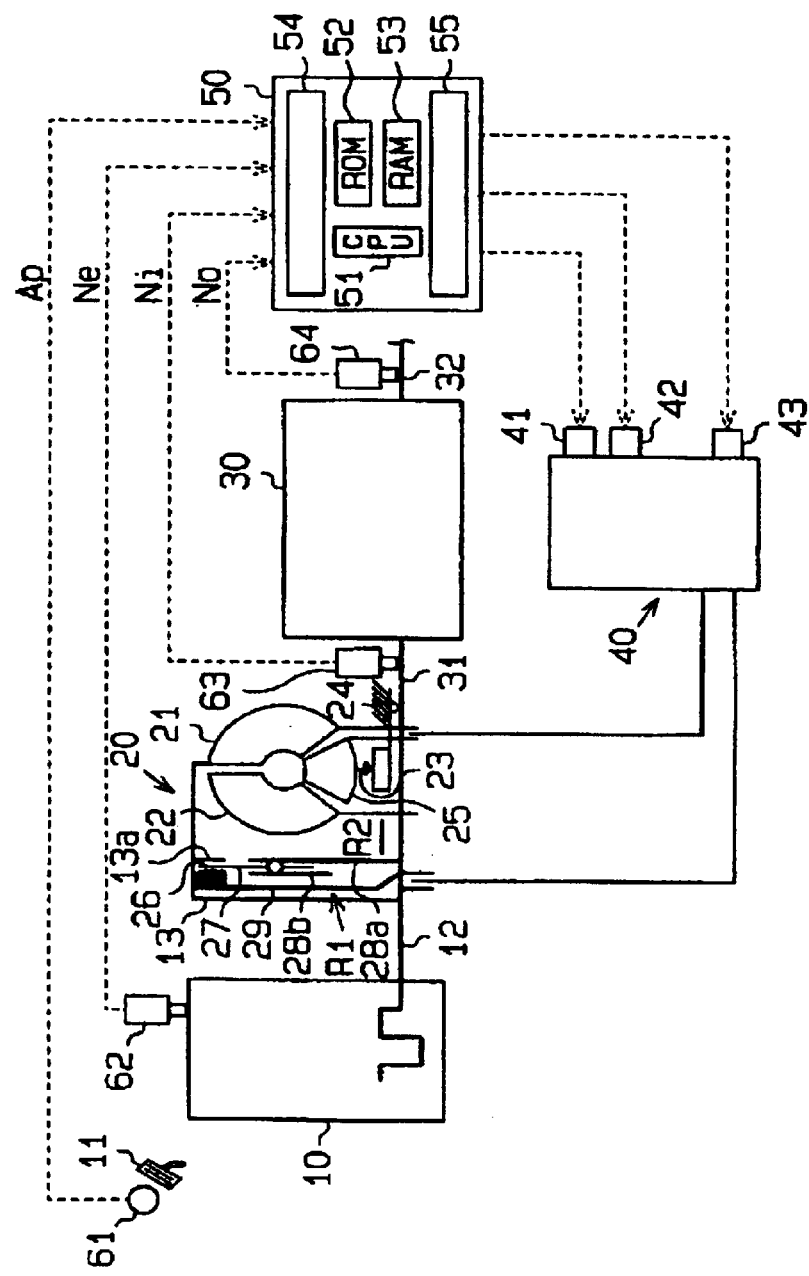
FIG. 1 is an overview of an automatic transmission boarded on a vehicle for carrying out a control method of a lockup clutch according to embodiments of the present invention.

Embodiments of a lockup clutch and a control method of the lockup clutch according to the present invention will be explained with reference to the illustrations of the drawing figures.

A slip rotation speed according to the embodiments of the present invention corresponds to a rotation speed shown with a difference between a rotation speed of a pump impeller and a rotation speed of a turbine runner. The slip rotation speed of a lockup clutch is determined in accordance with three regions including a non-lockup region (i.e., disengaged region), a lockup ON region (i.e., completely engaged region), and a slip region (i.e., region in which the pump impeller and the turbine runner are engaged while relatively rotating) in accordance with driving states of a vehicle. The slip rotation speed under the lockup ON region is determined to be approximately zero (i.e., the rotation speed of the pump impeller and the turbine runner is approximately identical). The slip rotation speed when the lockup clutch is under the slip region is determined to be the slip rotation speed to the degree for absorbing the engine vibration while improving the fuel consumption per mileage of the vehicle.

As shown in FIG. 1, a vehicle includes an engine 10, a torque converter 20 provided with a lockup clutch, an automatic transmission 30 including a plurality of planetary gear units, a hydraulic control circuit 40 for controlling the hydraulic pressure supplied to the automatic transmission 30, and an electric control device 50 supplying a control command signal to the hydraulic control circuit 40. The power of the engine 10 increased or decreased by depressing a throttle pedal 11 is transmitted to driving wheels via the torque converter 20, the automatic transmission 30, and a differential (not shown).

Figure 2:
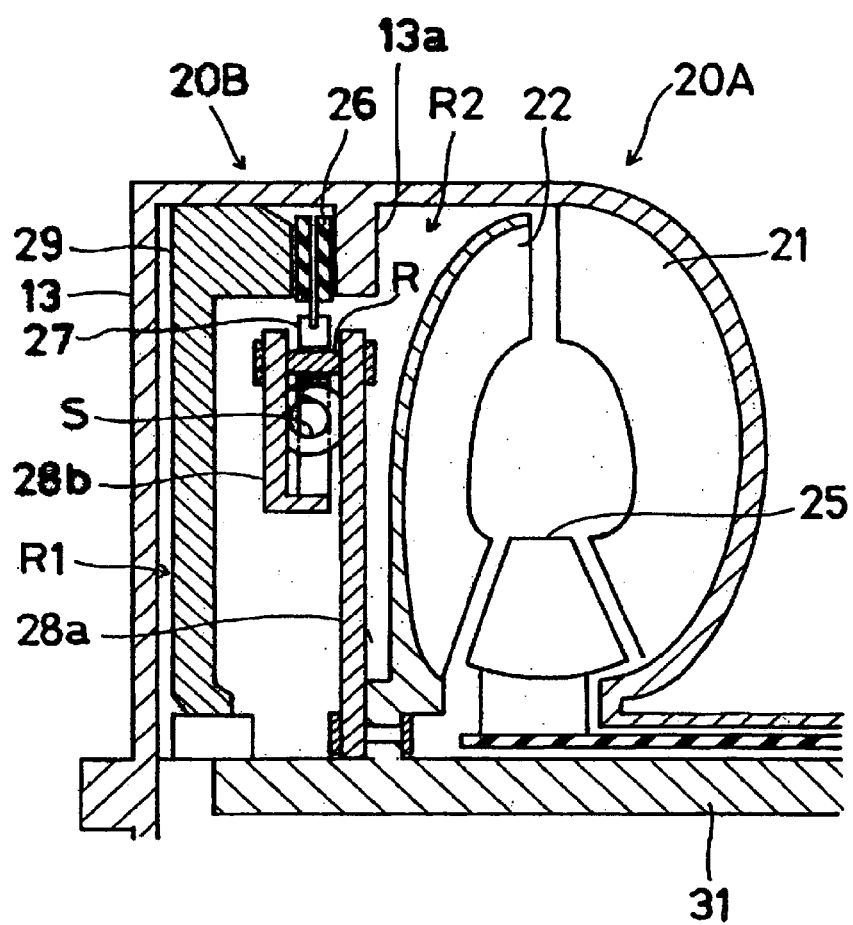
FIG. 2 is a cross-sectional view of a torque converter provided with a lockup clutch shown in FIG. 1.

As shown in FIG. 2, the torque converter 20 includes a hydraulic power transmission mechanism 20A and a lockup clutch 20B which is connected in parallel with the hydraulic power transmission mechanism 20A. The hydraulic power transmission mechanism 20A includes a pump impeller 21 connected to a crank shaft 12 of the engine 10 via a connection member 13 including a front cover of the torque converter 20, a turbine runner 22 fixed to an input shaft 31 of the automatic transmission 30 for rotatably receiving the fluid from the pump impeller 21, and a stator 25 fixed to a housing 24 via a one-way clutch 23. Viewing from the torque converter 20 side, the connection member 13 includes the pump impeller 21 connected to the output shaft (i.e., the crankshaft 12 of the engine) of the engine 10 and the input shaft 31 of the automatic transmission 30 includes the turbine runner 22 connected to be unitary rotated with the driving wheels of the vehicle.

The lockup clutch 20B includes a ring shaped friction plate 26 provided with friction member on both surfaces and supported movable in an axial direction, a ring shaped drive plate 27 fixed to radially inside of the friction plate 26, a clutch opposing portion 13a unitary formed with the connection member 13 provided opposing to the friction plate 26, a first driven plate 28a fixed to the input shaft 31 for unitary rotating with the input shaft 31 of the automatic transmission 30, a ring shape second driven plate 28b fixed to the first driven plate 28a with rivets R, a piston 29 movable in the axial direction for pushing the friction plate 26 to the clutch opposing portion 13a, and a plurality of coil springs S for absorbing the torque fluctuation between the drive plate 27 and the driven plates 28a, 28b.

The coil springs S are included in a damper mechanism for absorbing a vibration. The coil springs S are maintained in a long bore formed at appropriate portion along a circumferential direction of the first and the second driven plates 28a, 28b. When the a difference of rotational phases are generated between the drive plate 27 (friction plate 26) and the first driven plate 28a (the second driven plate 28b), the damper function is achieved between the drive plate 27 (friction plate 26) and the first driven plate 28a (the second driven plate 28b).

The piston 29 pushes the friction plate 29 towards the clutch opposing portion 13a when the hydraulic pressure in an engagement side hydraulic chamber R1 defined by the piston 29 and the connection member 13 reaches to be higher than the hydraulic pressure in a release side hydraulic chamber R2 defined by the friction plate 26, the clutch opposing portion 13a, and the first driven plate 28a to engage with the friction plate 26 with the clutch opposing portion 13a. On the other hand, when the hydraulic pressure in the release side hydraulic chamber R2 becomes higher than the hydraulic pressure in the engagement side hydraulic chamber R1, the piston 29 releases the friction plate 26 from the clutch opposing portion 13a to disengage the friction plate 26 and the clutch opposing portion 13a.

The automatic transmission 30 including the input shaft 31 and the output shaft 32 connected to the driving wheels via the differential selectively establishes one of plural forward gears or backward gears in accordance with the combinations of the engagement and the disengagement of plural hydraulic frictional engagement devices for rotating the input shaft 31 and the output shaft 32 via the selected gear. The automatic transmission 30 includes a known planetary gear device.

The hydraulic control circuit 40 includes a first solenoid valve 41 and a second solenoid valve 42 ON-OFF driven by the signal from the electric control device 50. The hydraulic frictional engagement device of the planetary gear is selectively operated in accordance with the combinations of the ON-OFF operation.

The hydraulic control circuit 40 further includes a third solenoid valve 43 for adjusting hydraulic pressure Pon, Poff supplied to the engagement side hydraulic chamber R1 and the release side hydraulic chamber R2 in order to control the engagement and the disengagement of the friction plate 26. The third solenoid valve 43 corresponds to a linear solenoid driven type solenoid in which the electric current value is controlled by the signal from the electric control circuit 50. The third solenoid valve 43 controls a line pressure adjusted by a regulator (not shown) by providing a signal pressure to a switching valve (not shown) and supplies a controlled hydraulic pressure to the engagement side hydraulic chamber R1. The hydraulic control circuit 40 supplies a predetermined hydraulic pressure to the release side hydraulic chamber R2 when the third solenoid valve 43 is controlled and supplies a drain pressure to the release side hydraulic chamber R2 when the third solenoid valve 43 is not controlled. A differential pressure between the hydraulic pressure in the engagement side hydraulic chamber R1 and the hydraulic pressure in the release side hydraulic chamber R2 corresponds to an engagement pressure of the friction plate 26.

The electric control device 50 corresponds to a microcomputer including a CPU 51, a ROM 52, a RAM 53, and interfaces 54, 55. The electric control device 50 is connected to a throttle opening degree sensor 61 for detecting an opening degree of the throttle pedal, an engine rotation speed sensor 62 for detecting the rotation speed of the engine 10, an input shaft rotation speed sensor 63 for detecting the rotation speed of the input shaft 31 of the automatic transmission 30, and an output shaft rotation speed sensor 64 for detecting the rotation speed of the output shaft 32 of the automatic transmission 30. The electric control device 50 is supplied with a signal indicating a throttle opening degree Ap, a signal indicating an engine rotation speed Ne (i.e., corresponding to the rotation speed of the pump impeller 21), a signal indicating an input shaft rotation speed Ni (i.e., corresponding to the rotation speed of the turbine runner 22), and a signal indicating an output shaft rotation speed No from respective sensors.

The CPU 51 of the electric control device 50 transacts various input signals following a program memorized in the ROM 52 while utilizing a memory function of the RAM 53 for performing a shift control of the automatic transmission 30, the engagement control of the friction plate 26, and the control for setting of the pre-charge time. The CPU 51 controls the actuation of the solenoid valves 41–43 via the interface 55. In other words, the control concerning the setting of the time for performing the pre-charge is carried out in the electric control device 50.

The shift control of the automatic transmission 30 will be explained as follows. The CPU 51 selects a shift diagram corresponding to the actual shift stage from plural shift diagram (not shown) memorized in the ROM 52 and determines the shift stage based on the vehicle speed SPD calculated from the output shaft rotation speed No and the throttle opening degree Ap using the selected shift diagram.

The shift control of the automatic transmission 30 is performed by actuating the first and the second solenoid valves 41, 42, so that the determined shift stage can be obtained.

Figure 3:
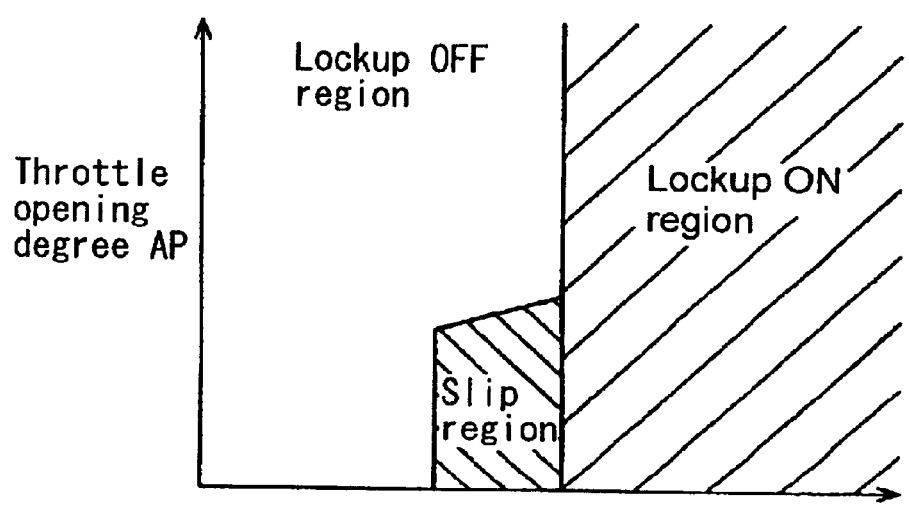
FIG. 3 is a view indicating regions of the lockup clutch and driving states of the vehicle.

The control of the lockup clutch 20B will be explained as follows. The CPU 51 judges whether the driving state of the vehicle is under a lockup-ON region shown in FIG. 3 based on the throttle opening degree Ap and the vehicle speed SPD. The lockup ON region corresponds to a region for establishing a state that the rotational speed of the pump impeller 21 and the turbine runner 22 become equal by completely engaging the friction plate 26 with the clutch opposing portion 13a. The slip region corresponds to a region for establishing a state that the turbine runner 21 rotates having a predetermined slip rotation speed (i.e., 50 rpm according to this embodiment) relative to the rotation speed of the pump runner 22 by engaging the friction plate 26 with the clutch opposing portion 13a under the state having smaller engagement pressure than pressure at the completely engaged state in order to absorb the vibration at low rotation of the engine 10 while eliminating the loss of the power transmission by the hydraulic power transmission mechanism.

When the vehicle driving state is neither under the lockup ON region nor the slip region, the hydraulic pressure Pon in the engagement side hydraulic chamber R1 is changed to be the drain pressure by outputting the drive command signal to the third solenoid valve 43 and by controlling the hydraulic pressure Poff of the release side hydraulic chamber R2 to be the high pressure close to the line pressure. In other words, the engagement pressure of the friction plate 26 is determined to be zero (0) and the lockup clutch 20B is disengaged.

On the other hand, when the vehicle driving state is under the lockup ON region, the engagement pressure is controlled so that the engine rotation speed Ne and the input shaft rotation speed Ni become equal. In case the driving state of the vehicle is under the slip region of FIG. 3, the engagement pressure is controlled so that the absolute value of the difference between the engine rotation speed Ne and the input shaft rotation speed Ni becomes less that 50 rpm.

The piston is operated swiftly by increasing the supply speed of the hydraulic pressure during the pre-charge in order to restrain the influence of the loss stroke of the piston for controlling the engagement pressure. When the pre-charge is completed to start engaging the friction plate 26 and the clutch opposing portion 13a, the differential pressure between the hydraulic pressure Pon in the engagement side hydraulic chamber R1 and the hydraulic pressure Poff in the release side hydraulic chamber R2 is feedback controlled by outputting the drive command signal to the third solenoid valve 43 so that the difference between the engine rotation speed Ne and the input shaft rotation speed Ni have a desired value thus to gradually increase the engagement pressure while restraining the engagement shock.

By repeating the foregoing control, the friction plate 26 includes a lockup state and a slip state and maintains the engagement pressure by maintaining the hydraulic pressure Pon, Poff in the engagement hydraulic chamber R1 and the release side hydraulic chamber R2 respectively.

The control for setting the pre-charge time will be explained with reference to FIG. 4. The pre-charge time according to the present invention corresponds to a time from starting the control of the engagement pressure of the lock up clutch 20B after moving on the vehicle state to either one of the lock up ON region or the slip region until starting the control of the engagement pressure by the feedback control.

Figure 4:
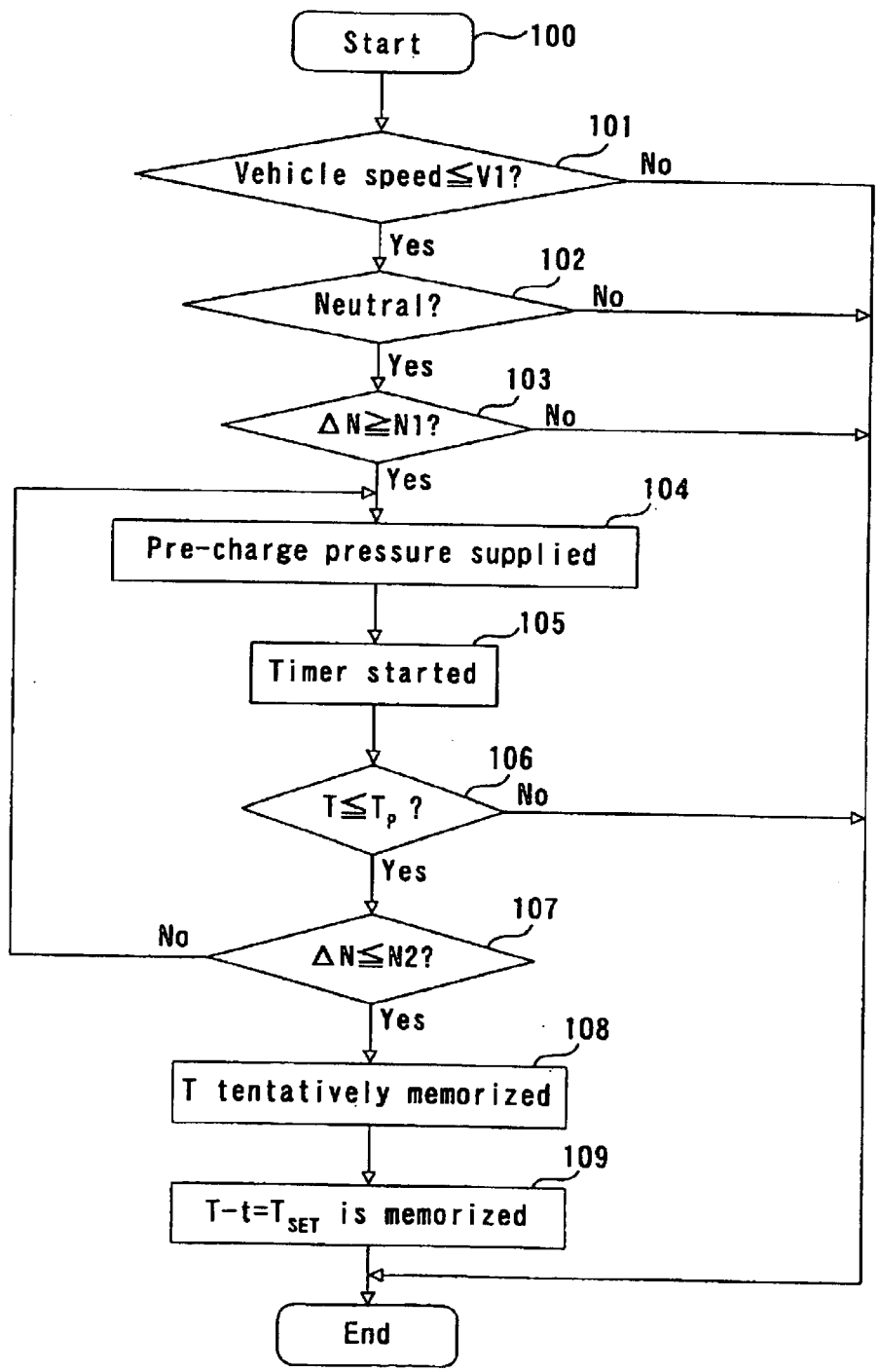
FIG. 4 is a flowchart showing a control for a setting of a pre-charge time according to a first embodiment of the present invention.

The transaction of the routine shown in FIG. 4 is started from Step 100 by CPU 51 every predetermined time. In Step 101, the CPU 51 judges whether the vehicle speed is less than a predetermined speed V1. The vehicle speed V1 corresponds to small vehicle speed close to zero and is determined so that the vehicle has a speed which is judged to be substantially zero (0) when the vehicle speed is V1. When the vehicle speed is judged to be greater than V1 in Step 101, the routine ends without performing the setting of the pre-charge time considering the vehicle safety.

The transaction is forwarded to Step 102 when it is judged that the vehicle speed is equal to or less than V1 in Step 101 to judge the shift stage of the automatic transmission 30 is under a neutral state. When the shift stage is not under the neutral state, that is, when the shift stage is at the forward state, backward state, or parking state, the power transmitted to the turbine runner 22 is transmitted to the output shaft 32. Because the engagement shock is transmitted to the vehicle when the lockup clutch 20B is engaged, in case it is judged that the shift stage is not under the neutral state in Step 102, the routine is ended without setting the pre-charge time.

When it is judged that the shift stage is under the neutral state in Step 102, the transaction is forwarded to Step 103 to judge whether the slip rotation speed ΔN between the pump impeller 21 and the turbine runner 22 is equal to or greater than a first predetermined rotation number N1 (i.e., 40 rpm). When it is judged that the slip rotation speed ΔN is less than the first predetermined rotation number N1 in Step 103, the routine is ended without setting the pre-charge time because the pre-charge time may not be accurately determined.

When it is judged that the slip rotation speed ΔN is equal to or greater than the first predetermined rotation number N1 in Step 103, the transaction is forwarded to Step 104 to supply the pre-charge pressure to the engagement side hydraulic chamber R1. The pre-charge pressure is a hydraulic pressure predetermined to have a high pressure close to the line pressure in order to shorten the loss stroke of the piston 29. In Step 105, a timer is started for measuring the time from starting the supply of the pre-charge pressure. The transaction is forwarded to Step 106 for judging whether a time value T exceeds a predetermined time $T_P$. When it is judged that the timer value T exceeds the predetermined time $T_P$, the routine is ended without setting the pre-charge time because the piston 29 may not normally operate.

The transaction is forwarded to Step 107 in case the timer value T does not exceed the predetermined time $T_P$ in Step 106 to judge whether the slip rotation speed ΔN between the pump impeller 21 and the turbine runner 22 is equal to or less than a second predetermined rotation number N2 (i.e., 10 rpm). The second predetermined rotation number N2 corresponds to a predetermined rotation number determined based on an experimentally obtained-value and the rotation number when the slip control can be started, in other words, when the loss stroke of the piston 29 is killed by stroking to start the engagement of the lockup clutch 20B by the force applied to the piston 29. The second predetermined rotation number N2 serves as a predetermined value of claim 2.

When it is judged that the slip rotation speed ΔN reaches equal to or less than the second predetermined rotation number N2 in Step 107, the transaction is forwarded to Step 108 to tentatively memorize the time required from starting the timer in Step 105 to forwarding to Step 108 in the RAM 53. The timer value T serves as a required time in claim 2. In Step 109, a time subtracting a small time t from the memorized timer value T (i.e., slightly shorter time than the timer value T) memorized in Step 108 is memorized in the RAM 53 as a pre-charge time $T_{SET}$. Provided that the timer value T memorized in Step 108 is determined as the pre-charge time $T_{SET}$, the engagement shock of the lockup clutch 20B is generated at the end of the pre-charge. By carrying out the transaction of Step 109, the pre-charge time $T_{SET}$ is determined so that the pre-charge is completed immediately before generating the engagement shock by subtracting the small time t from the timer value T. In case the slip rotation speed ΔN is greater then the second predetermined rotation number N2, the transactions from Step 104 to Step 106 are repeatedly performed until the slip rotation speed ΔN reaches equal to or less than the second predetermined rotation number N2 within a range that the timer value T does not exceed the predetermined time $T_P$ in Step 106.

The pre-charge time $T_{SET}$ determined in the foregoing manner is adopted from performing the next lockup control or the slip control of the lockup clutch 20B. Although the timing for carrying out the control for determining the pre-charge time $T_{SET}$ is not specifically limited and is performed every predetermined time according to this embodiment, the determination of the pre-charge time $T_{SET}$ is performed at any timing such as immediately after the start of engine 10, immediately after the stop of the engine 10, or after driving of the vehicle for a predetermined distance.

A second embodiment of the present invention will be explained as follows. The construction of the second embodiment is the same with the first embodiment except for the control for determining the pre-charge time. Thus, the explanation of the construction and the control of the second embodiment the same with the first embodiment is not repeated.

Figure 5:
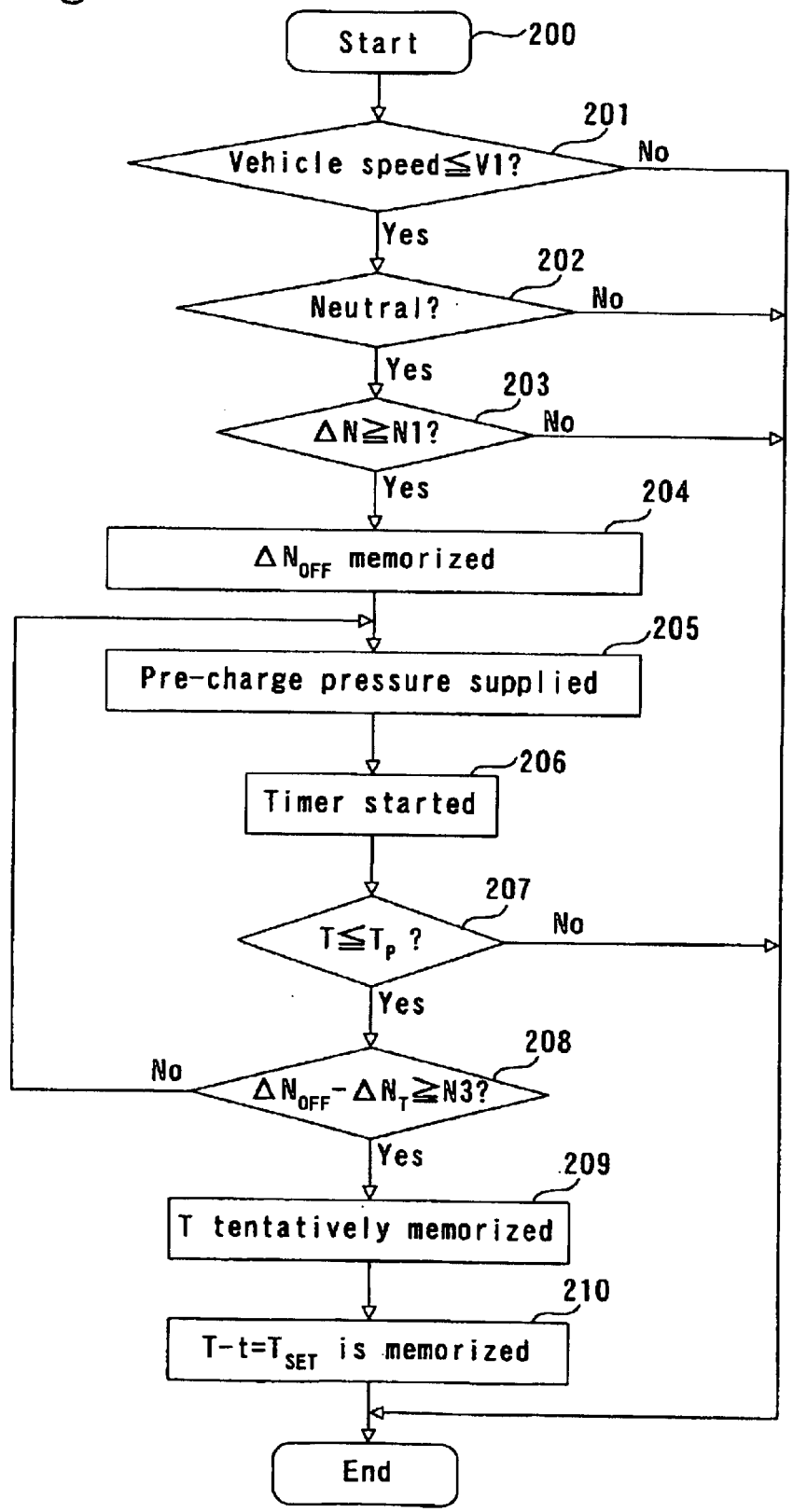
FIG. 5 is a flowchart showing a control for a setting of a pre-charge time according to a second embodiment of the present invention.

Steps 200 through 203 in FIG. 5 show the identical transactions of Steps 100 through 103 in FIG. 4. Further, Steps 209 through 210 of FIG. 5 are identical to Steps 108 through 109 of FIG. 4. Thus, the explanations are not repeated.

In case it is judged that the slip rotation speed ΔN is equal to or greater than the first predetermined rotation number N1 in Step 203, the transaction is forwarded to Step 204 to memorize a slip rotation speed ΔNOFF before operating the piston 29, in other words, before the supply of the pre-charge pressure, in the RAM 53. Thereafter, the transaction is forwarded to Step 205 to supply the pre-charge pressure to the engagement side hydraulic chamber R1. The pre-charge pressure is determined to be high pressure closer to the line pressure in order to shorten the loss stroke of the piston 29. Next, the timer is started for measuring the time from the start of the supply of the pre-charge pressure in Step 206. In step 207, it is judged whether the timer value T exceeds the predetermined time $T_P$. In case it is judged that the timer value T exceeds the predetermined time $T_P$, the routine is ended without performing the setting of the pre-charge time because the piston 29 is not normally operated.

In case it is judged that the timer value T does not exceed the predetermined time $T_P$ in Step 107, the transaction is forwarded to Step 208. In Step 208, it is judged whether the value subtracting a slip rotation speed $\Delta N_T$ at a time after the operation of the piston (i.e., after starting the pre-charge) from the slip rotation speed $\Delta N_{OFF}$ is equal to or greater than a third predetermined rotation number N3 (i.e., 30 rpm). The third predetermined rotation number N3 corresponds to a rotation number subtracting the slip rotation speed when enabling to start the slip control (i.e., when the loss stroke of the piston 29 is killed by stroking of the stroke 29 to start the engagement of the lockup clutch 20B from the slip rotation speed $\Delta N_{OFF}$ before operating the piston 29. $\Delta N_{OFF}$ is predetermined based on the experimentally obtained value and serves as a predetermined value in claim 3.

When it is judged that the difference of the slip rotation speed (i.e., $\Delta N_{OFF}-\Delta N_T$) reaches equal to or greater than the third predetermined rotation number N3 in Step 208, the transaction is forwarded to Step 209 and Step 210 for determining the pre-charge time $T_{SET}$ likewise the first embodiment. When the difference of the slip rotation speed (i.e., $\Delta N_{OFF}-\Delta N_T$) is smaller than the third predetermined rotation number N3, the transactions of Steps 205 through 207 are repeated until the difference of the slip rotation speed (i.e., $\Delta N_{OFF}-\Delta N_T$) reaches to be equal to or greater than the third predetermined rotation number N3 within a range that the timer value T does not exceed the predetermined time $T_P$ in Step 207. The timer value T memorized in Step 209 serves as a required time of claim 3.

A third embodiment of the present invention will be explained as follows. The third embodiment shares the same construction with the first embodiment likewise the second embodiment except for the control for setting the pre-charge time. Thus, explanations for the identical construction and the control will not be repeated.

Figure 6:
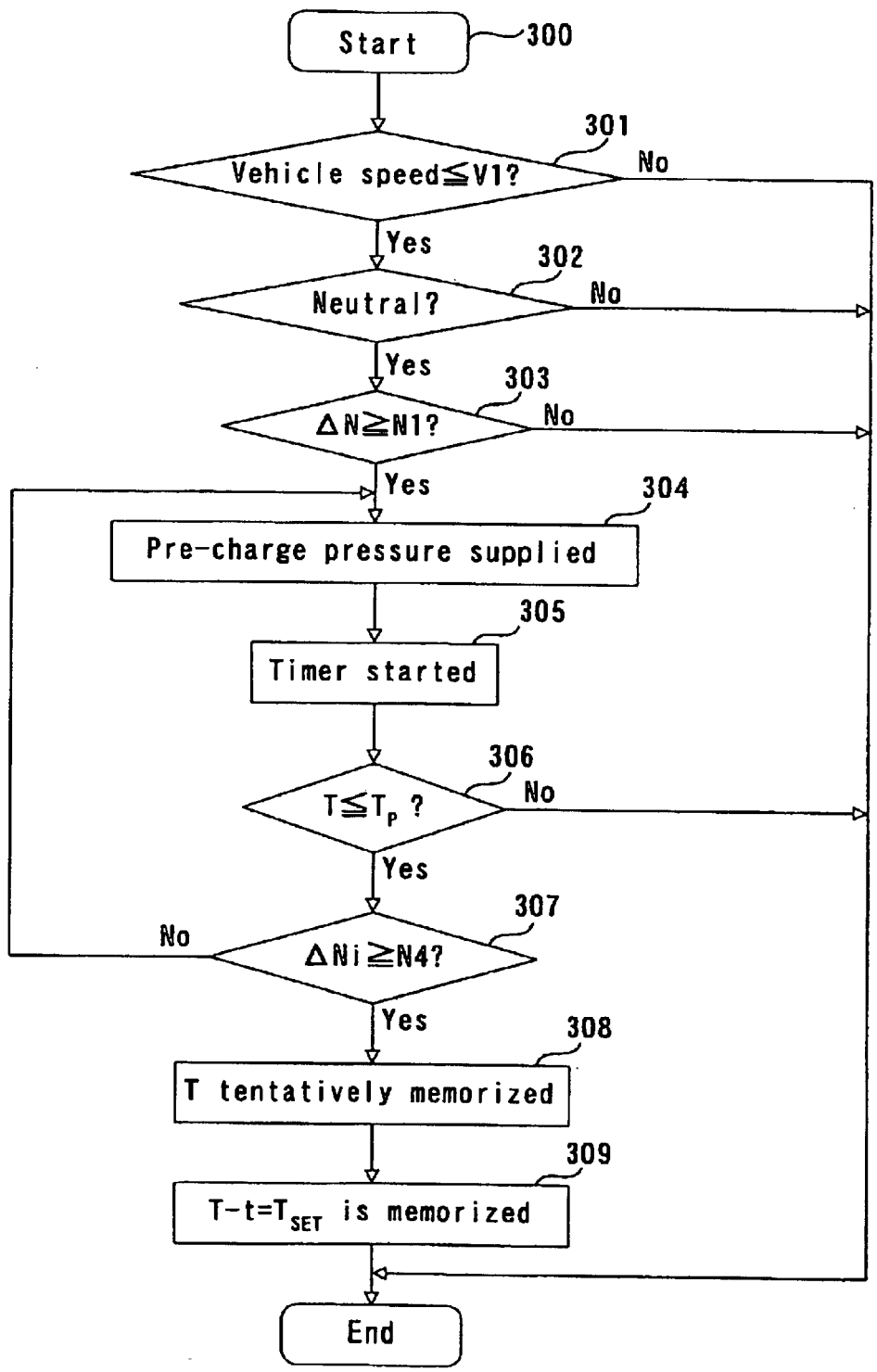
FIG. 6 is a flowchart showing a control for a setting of a pre-charge time according to a third embodiment of the present invention.

Transactions from Steps 300 through 306 of FIG. 6 are the same with the transactions from Steps 100 through 106 of FIG. 4. Further, the transactions from Steps 308 through 309 and the transactions from Steps 108 through 109 are the identical. Thus, the explanation is not repeated.

In case the timer value T does not exceed the predetermined time $T_P$ in Step 306, the transaction forwards to Step 307. In Step 307, it is judged whether a rotation number ΔNi subtracting a turbine rotation number Ni at supplying a previous pre-charge pressure from a turbine rotation number Ni at supplying present pre-charge pressure is equal to or greater than a fourth predetermined rotation number N4 (i.e., 10 rpm). This method derives from the phenomenon that the turbine rotation number Ni is suddenly increased in accordance with the pump rotation number Ne when the pump impeller 21 starts engaging with the turbine runner 22 although the present turbine rotation number Ni and the previous turbine rotation number Ni are approximately the same before the start of the engagement between the pump impeller 21 and the turbine runner 22 from the start of the supply of the pre-charge pressure. The fourth predetermined rotation number N4 corresponds to a predetermined rotation number by experimentally obtaining an increase mount of the turbine rotation number Ni when start engaging. The fourth rotation number N4 serves as a predetermined value of claim 4.

When it is judged that a difference ΔNi between the previous turbine rotation number Ni and the present turbine rotation number Ni reaches equal to or greater than the fourth predetermined rotation number N4 in Step 107, the transaction is forwarded to Step 308 and 309 to determine the pre-charge time $T_{SET}$ likewise the first embodiment. When the difference ΔNi of the turbine rotation numbers is less than the fourth predetermined rotation number N4, the transactions from Steps 304 through Step 306 are repeatedly carried out until the difference ΔNi of the turbine rotation number becomes equal to or greater than the fourth predetermined rotation number N4 within a range that the timer value T does not exceed the predetermined time $T_P$ in Step 306. The timer value T memorized in Step 308 serves as required time of claim 4.

With the embodiments of the present invention, because the determination of the pre-charge time is performed when the shift stage of the automatic transmission 30 is under the neutral state, the engagement shock is not transmitted to the output shaft 32 of the automatic transmission 30 even when the lockup clutch 20B is suddenly engaged during the setting of the pre-charge time and thus the shock due to the engagement of the lockup clutch 20B is not transmitted to the vehicle. Under the normal lockup control or the slip control, because the pre-charge is swiftly performed and the engagement shock of the lockup clutch 20B is restrained based on the appropriately determined pre-charge time, the operator of the vehicle does not feel uncomfortable due to the engagement shock.

According to the embodiments of the present invention, because the engagement shock is not transmitted to the output shaft of the automatic transmission even when the lockup clutch is suddenly engaged during the setting of the pre-charge, the engagement shock is not transmitted to the vehicle, which is preferable.

According to the embodiments of the present invention, because the setting of the pre-charge time is performed when shift stage of the automatic transmission is at the neutral state, the engagement shock is not transmitted to the output shaft of the automatic transmission even when the lockup clutch is suddenly engaged during the setting of the pre-charge time. Thus, the engagement shock is not transmitted to the vehicle per se.

According to the embodiments of the present invention, because the detection signals required are only the rotation number of the pump impeller and the turbine runner or only the rotation number of the turbine runner, the detection signal required for controlling the lockup clutch ad the sensor for detecting can be restrained to the minimum.

According to the embodiments of the present invention, the predetermined values indicate different predetermined values of different parameters and respective predetermined values may not have the identical values at the actual value.

According to the embodiments of the present invention, the engagement shock of the lockup clutch by the pre-charge can be avoided by subtracting the small time from the required time when the required time shows the time when the lockup clutch starts engaging.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control method of a lockup clutch comprising:

eliminating a loss stroke of a piston by a pre-charged hydraulic pressure;

increasing a force applied to the piston by further supply of the hydraulic pressure after the pre-charge;

controlling a slip rotation speed between a pump impeller and a turbine runner in a torque converter connected to an automatic transmission; and determining a time for performing the pre-charge when a shift stage of the automatic transmission is under a neutral state and a vehicle is substantially stopped.

2. A control method of a lockup clutch according to claim 1, wherein the time for performing the pre-charge is determined based on a required time from starting the pre-charge of the hydraulic pressure until the slip rotation speed reaches equal to or less than a predetermined value.

3. A control method of a lockup clutch according to claim 1, wherein the time for performing the pre-charge is determined based on a required time from starting the pre-charge of the hydraulic pressure until a difference between the slip rotation speed under no-operation of the lockup clutch and the slip rotation speed during an operation of the lockup clutch becomes equal to or greater than a predetermined value.

4. A control method of a lockup clutch according to claim 1, wherein the time for performing the pre-charge is determined based on a required time from starting the pre-charge of the hydraulic pressure until increasing the rotation number of the turbine runner to be equal to or greater than a predetermined value.

5. A control method of a lockup clutch according to claim 2, wherein the pre-charge of the hydraulic pressure is performed for a predetermined time from a start of the pre-charge of the hydraulic pressure until immediately before elapsing of the required time.

6. A control method of a lockup clutch according to claim 3, wherein the pre-charge of the hydraulic pressure is performed for a predetermined time from a start of the pre-charge of the hydraulic pressure until immediately before elapsing of the required time.

7. A control method of a lockup clutch according to claim 4, wherein the pre-charge of the hydraulic pressure is performed for a predetermined time from a start of the pre-charge of the hydraulic pressure until immediately before elapsing of the required time.

* * * * *